United States Patent
Panchal et al.

(10) Patent No.: US 10,425,800 B1
(45) Date of Patent: Sep. 24, 2019

(54) GENERATING LOCATION INFORMATION FOR AN E911 CALL

(71) Applicant: Verizon Patent and Licensing Inc., Arlington, VA (US)

(72) Inventors: Abhishek R. Panchal, Wallington, NJ (US); Mingxing Li, San Jose, CA (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 0 days.

(21) Appl. No.: 16/101,780

(22) Filed: Aug. 13, 2018

(51) Int. Cl.
*H04W 4/90* (2018.01)
*H04L 29/06* (2006.01)
*H04W 76/50* (2018.01)
*H04W 4/02* (2018.01)

(52) U.S. Cl.
CPC .......... *H04W 4/90* (2018.02); *H04L 65/102* (2013.01); *H04L 65/1006* (2013.01); *H04W 4/025* (2013.01); *H04W 76/50* (2018.02)

(58) Field of Classification Search
CPC .......... H04W 4/90; H04W 68/02; G01S 19/48
See application file for complete search history.

(56) References Cited

U.S. PATENT DOCUMENTS

| | | | | |
|---|---|---|---|---|
| 2009/0176474 | A1* | 7/2009 | Bajko | H04M 11/04 |
| 2017/0105193 | A1* | 4/2017 | Liu | H04W 68/02 |
| 2017/0285180 | A1* | 10/2017 | Wang | G01S 19/48 |
| 2017/0366954 | A1* | 12/2017 | Sabeur | H04W 4/22 |

* cited by examiner

*Primary Examiner* — Myron Wyche

(57) ABSTRACT

A method may include receiving, a session initiation protocol (SIP) Invite message associated with a Voice over WiFi (VoWiFi) call made by a user device and determining if the SIP Invite message includes a geolocation header having location information associated with the user device. The method may also include in response to determining that the SIP Invite message includes a geolocation header having location information, initiating a location session with the user device and generating assistance data based on the location information, wherein the assistance data is to be used by the user device to generate assisted global positioning system (aGPS) measurements. The method may further include transmitting, to the user device and during the location session, the assistance data, receiving, from the user device, aGPS measurements based on the assistance data and determining, based on the aGPS measurements, a location of the user device.

20 Claims, 9 Drawing Sheets

GENERATING LOCATION INFORMATION FOR AN E911 CALL

BACKGROUND INFORMATION

During an emergency call, such as a "9-1-1" call, determining the caller's location is very important. For example, enhanced 911 (E911) is a system that is used to automatically provide the location of the caller, such as the caller's street address, to a dispatcher to enable the dispatcher to send emergency responders to the caller's location.

With the increased use of Voice over Internet Protocol (VoIP) calling, such as Voice over WiFi (VoWiFi) calling, determining a caller's address requires additional steps as compared to calls from conventional landline telephones. For example, if a caller is using VoWiFi, the caller must register his/her civic address (e.g., a street name and number and a city) with a service provider when first activating the VoWiFi service. If the user of VoWiFi calling moves from his/her home to his/her office, the user must again register his/her civic address associated with the new location with the service provider. Such registration is time consuming for users. In addition, if a caller has not registered his/her address before making a 9-1-1 call, the E911 system may be unable to determine the caller's location.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to providing location information for an E911 call made using VoWiFi to enable an emergency call center dispatcher to be able to send emergency personnel to the caller's location. For example, the calling device may determine a coarse or general location associated with the calling device when the E911 call is initiated. The calling device may insert the coarse location information into a field of a session initiation protocol (SIP) message associated with the call to enable a location server to aid in obtaining a caller's more precise current location. For example, the calling device may insert the device location into a geolocation header of a SIP Invite message. A location server associated with identifying the caller's location for an emergency call center dispatcher (e.g., a public service answering point (PSAP)) may then generate assistance data, such as assisted Global Positioning System (aGPS) satellite information, and provide the assistance data (e.g., aGPS assistance data) to the calling device. The calling device may then use the assistance data generated by the location server to quickly obtain aGPS measurements corresponding to the caller's location that may be used by the location server to generate a civic address corresponding to the caller's location. In this manner, if the caller moves between locations and makes an E911 call, the caller's location is dynamically determined without requiring the caller to register his/her civic address at each location. In addition, providing a coarse location and then receiving aGPS assistance information associated with the coarse location enables the calling device to quickly provide its current location.

Figure 1:
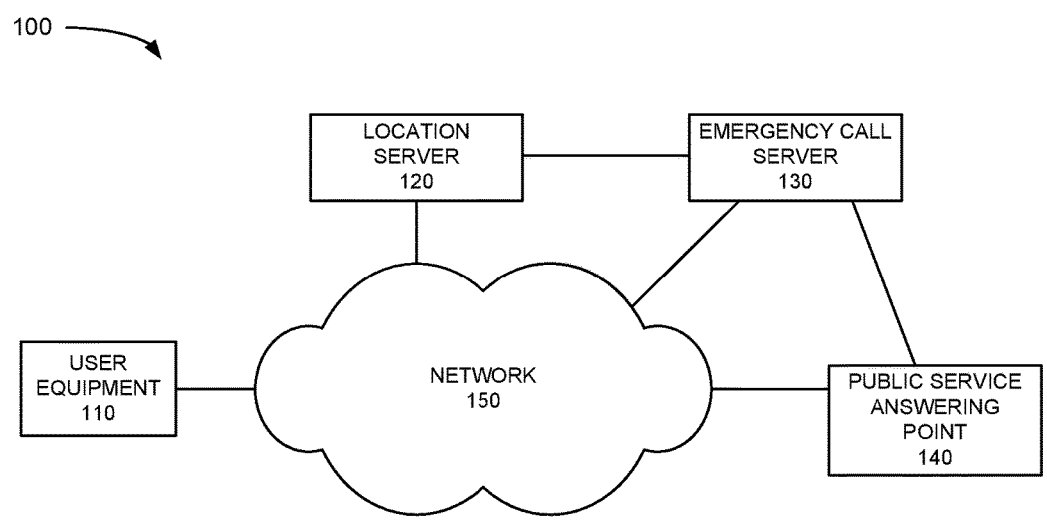
FIG. 1 illustrates an exemplary environment in which systems and methods described herein may be implemented.

FIG. 1 is a block diagram of an exemplary environment 100 in which systems and methods described herein may be implemented. Environment 100 may include user equipment 110, location server 120, emergency call server 130, public service answering point (PSAP) 140 and network 150.

User equipment (UE) 110 (also referred to herein as UE device 110 or user device 110) may include a mobile device, such as wireless or cellular telephone device (e.g., a conventional cell phone with data processing capabilities), a smart phone, a personal digital assistant (PDA) that can include a radiotelephone, etc. In another implementation, UE 110 may include any type of mobile computer device or system, such as a personal computer (PC), a laptop, a tablet computer, a notebook, a netbook, a wearable computer (e.g., a wrist watch, eyeglasses, etc.), a game playing device, a music playing device, a home appliance device, a home monitoring device, etc., that includes communication functionality. UE 110 may connect to network 150 and other devices in environment 100 (e.g., location server 120, emergency call server 130 and PSAP 140) via any conventional technique, such as wired, wireless, optical connections or a combination of these techniques. UE 110 and the person associated with UE 110 (e.g., the party holding or using UE 110) may be referred to collectively as UE 110 in the description below.

Location server 120 may include one or more computing devices or systems used to determine the location of UE 110. For example, location server 120 may acts as an interface for PSAP 140 to identify a civic address for a caller. In one implementation, location server 120 may communicate with UE 110 to initiate a location session with UE 110 and provide assistance data, such as aGPS information to UE 110. The assistance data may enable UE 110 to quickly generate aGPS measurements based on the location of UE 110, as described in more detail below.

Emergency call server (ECS) 130 may include one or more computer devices and systems associated with obtaining caller location information associated with an E911 call. In an exemplary implementation, ECS 130 acts as a gateway or interface between location server 120 and PSAP 140. For example, ECS 130 may interface with location server 120 and PSAP 140 to provide the civic address of a VoWiFi caller to PSAP 140, as described in more detail below.

PSAP 140 may include one or more computing devices or systems associated with a call center that receives calls, such as E911 calls. PSAP 140 may include hundreds of operators/dispatchers and corresponding workstations to identify callers' locations and dispatch the appropriate emergency personnel to the callers' locations. In an exemplary implementation, when PSAP 140 needs location information for a caller, PSAP 140 signals ECS 130 to obtain the location information. ECS 130 may then interface with location server 120 to obtain the location information for a VoWiFi caller and forward the location information to PSAP 140, as described in detail below.

Network 150 may include one or more wired, wireless and/or optical networks that are capable of receiving and transmitting data, voice and/or video signals. For example, network 150 may include one or more public switched telephone networks (PSTNs) or other type of switched network. Network 150 may also include one or more wireless networks and may include a number of transmission towers for receiving wireless signals and forwarding the wireless signals toward the intended destination. Network 150 may further include one or more satellite networks, one or more packet switched networks, such as an Internet protocol (IP) based network, a local area network (LAN), a personal area network (PAN), a WiFi network, a Bluetooth network, a wide area network (WAN), a long term evolution (LTE) network, a fourth generation (4G) network, a 4G LTE Advanced network, a fifth generation (5G) network, an intranet, the Internet, or another type of network that is capable of transmitting data. Network 150 provides wireless packet-switched services and wireless Internet protocol (IP) connectivity to user devices 110 to provide, for example, data, voice, and/or multimedia services.

The exemplary configuration illustrated in FIG. 1 is provided for simplicity. It should be understood that a typical network may include more or fewer devices than illustrated in FIG. 1. For example, environment 100 may include a large number (e.g., thousands or more) of UEs 110, multiple location servers 120, multiple emergency call servers 130 and multiple PSAPs 140. In addition, network 150 may include additional elements, such as eNodeBs, base stations, switches, gateways, routers, monitoring devices, etc., that aid in routing calls.

In addition, various functions are described below as being performed by particular components in environment 100. In other implementations, various functions described as being performed by one device may be performed by another device or multiple other devices, and/or various functions described as being performed by multiple devices may be combined and performed by a single device.

Figure 2:
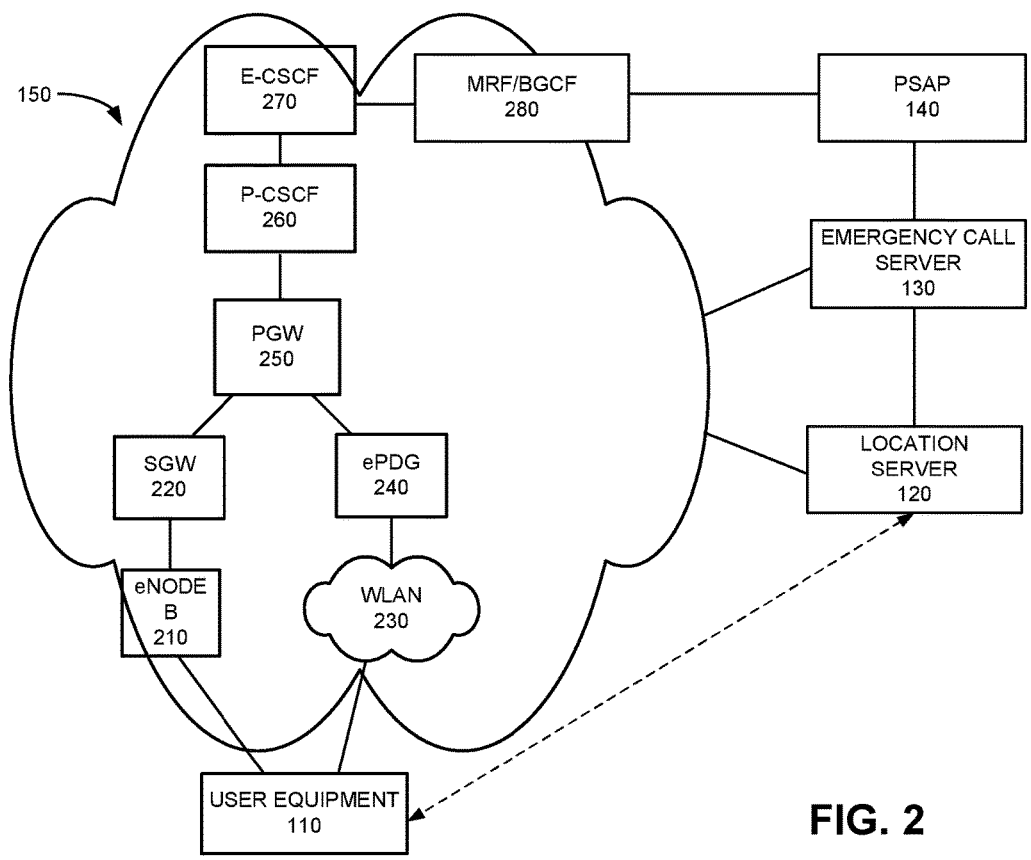
FIG. 2 illustrates an exemplary configuration of components implemented in a portion of the network of FIG. 1.

FIG. 2 is an exemplary block diagram illustrating a portion of network 150 along with elements of environment 100. In the implementation depicted in FIG. 2, network 150 is a long term evolution (LTE) network. It should be understood, however, that embodiments described herein may operate in other types of wireless networks, such as networks operating in accordance with other networking standards, such as Global System for Mobile Communications (GSM), Universal Mobile Telecommunications System (UMTS), IS-200, etc., a 4G network, a 4G LTE Advanced network, a 5G network, etc.

Network 150 may include an evolved packet core (ePC) that includes an evolved Node B (eNodeB) 210, serving gateway (SGW) 220, wireless local area network (WLAN) 230, evolved packet data gateway (ePDG) 240, packet gateway (PGW) 250, proxy call session control function (P-CSCF) 260, emergency call session control function (E-CSCF) 270 and media resource function/breakout gateway control function (MRF/BGCF) 280.

eNodeB 210 may be part of an evolved Universal Mobile Telecommunications System (UMTS) Terrestrial Radio Access Network (eUTRAN). eNodeB 210 may include one or more devices and other components that allow user devices 110 to wirelessly connect to network 150. eNodeB 210 may be associated with one or more cells/sectors. For example, each cell or sector in network 150 may include one or more radio frequency (RF) transceivers pointed in a particular direction.

eNodeB 210 may interface with a mobility management entity (MME) (not shown in FIG. 2) to activate and deactivate bearers for user devices 110, may authenticate respective users of user devices 110, and may interface with non-LTE radio access networks. SGW 220 may provide an access point to and from UE devices 110, may handle forwarding of data packets for UE devices 110 and may act as a local anchor point during handover procedures between eNodeBs 210. SGW 220 may interface with PGW 250, described below.

WLAN 230 may represent a wireless local area network used by UE 110 to communicate via network 150, such as place VoWiFi calls, receive data via network 150, etc. ePDG 240 may include one or more computing devices to forward communications received from UE 110 via WLAN 230 to other devices in network 150, such as PGW 250. PGW 250 may function as a gateway to a core network, such as a WAN that allows delivery of Internet protocol (IP) services to UEs 110.

P-CSCF 260 may include one or more computing devices that is part of the evolved packet core that provides UE 110 with voice and data services. P-CSCF 260 may provide subscriber authentication, policy control and/or bandwidth management associated with UE 110 accessing services via network 150.

E-CSCF 270 may include one or more computing devices that support emergency services, such as forwarding an E911 call to the appropriate destination. For example, E-CSCF 270 may receive an E911 call from UE 110 via P-CSCF 260 and forward the call to the appropriate destination, such as PSAP 140.

MRF/BGCF 280 may include one or more computing devices that provide media related functions associated with communications to/from UE 110. MRF/BGCF 280 may also forward requests or calls received by E-CSCF 270, such as an E911 call, to PSAP 140.

The dotted line in FIG. 2 between location server 120 and UE 110 represents a location session between location server 120 and UE 110. The location session may be performed in accordance with LTE positioning protocol (LPP), LPP extensions (LPPe), secure user plane location (SUPL) protocol, a control plane protocol, or another protocol. In addition, although the dotted line in FIG. 2 is shown as a direct connection between location server 120 and UE 110, in an exemplary implementation, the communications between location server 120 and UE 110 are via network 150.

Although FIG. 2 shows exemplary components of network 150, in other implementations, network 150 may include fewer components, different components, differently arranged components, or additional components than depicted in FIG. 2. For example, network 150 may include other devices, such as a home subscriber server (HSS), policy charging and rules function (PCRF), etc., that aid in forwarding data in network 150 and to devices outside network 150.

Network 150 may also include a large number of eNodeBs 210, SGWs 220, WLANs 230, ePDGs 240, PGWs 250, P-CSCFs 260, E-CSCFs 270 and MIRF/BGCFs 280. Additionally, or alternatively, one or more components of network 150 may perform functions described as being performed by one or more other components.

Figure 3:
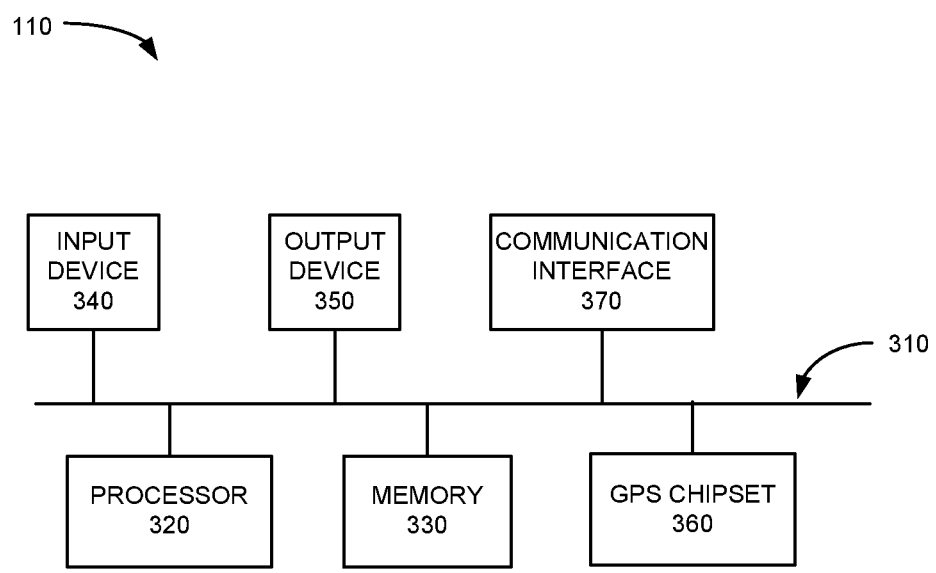
FIG. 3 illustrates an exemplary configuration of logic components included in one or more of the devices of FIG. 1.

FIG. 3 illustrates an exemplary configuration of UE 110. Other devices in environment 100, such as location server 120, ECS 130, PSAP 140 and elements illustrated in network 150 shown in FIG. 2 may be configured in a similar manner. Referring to FIG. 3, UE 110 may include bus 310, processor 320, memory 330, input device 340, output device 350, GPS chipset 360 and communication interface 370. Bus 310 may include a path that permits communication among the elements of UE 110.

Processor 320 may include one or more processors, microprocessors, or processing logic that may interpret and execute instructions. Memory 330 may include a random access memory (RAM) or another type of dynamic storage device that may store information and instructions for execution by processor 320. Memory 330 may also include a read only memory (ROM) device or another type of static storage device that may store static information and instructions for use by processor 320. Memory 330 may further include a solid state drive (SDD). Memory 330 may also include a magnetic and/or optical recording medium (e.g., a hard disk) and its corresponding drive.

Input device 340 may include a mechanism that permits a user to input information to UE 110, such as a keyboard, a keypad, a mouse, a pen, a microphone, a touch screen, voice recognition and/or biometric mechanisms, etc. Output device 350 may include a mechanism that outputs information to the user, including a display (e.g., a liquid crystal display (LCD)), a printer, a speaker, etc. In some implementations, a touch screen display may act as both an input device and an output device.

GPS chipset 360 may include hardware and firmware associated with determining GPS coordinates for UE 110. In an exemplary implementation, GPS chipset 360 may receive assistance information and generate aGPS measurements based on the assistance information, as described in detail below.

Communication interface 370 may include one or more transceivers that UE 110 (or ECS 130 and/or PSAP 140) uses to communicate with other devices via wired, wireless or optical mechanisms. For example, communication interface 370 may include one or more radio frequency (RF) transmitters, receivers and/or transceivers and one or more antennas for transmitting and receiving RF data via network 150. Communication interface 370 may also include a modem or an Ethernet interface to a LAN, such as WLAN 230, or other mechanisms for communicating with elements in a network, such as network 150 or another network.

The exemplary configuration illustrated in FIG. 3 is provided for simplicity. It should be understood that UE 110 (or location server 120, ECS 130 and/or PSAP 140) may include more or fewer devices than illustrated in FIG. 3. In an exemplary implementation, UE 110 (or location server 120, ECS 130 or PSAP 140) perform operations in response to processor 320 executing sequences of instructions contained in a computer-readable medium, such as memory 330. A computer-readable medium may be defined as a physical or logical memory device. The software instructions may be read into memory 330 from another computer-readable medium (e.g., a hard disk drive (HDD), SSD, etc.), or from another device via communication interface 370. Alternatively, hard-wired circuitry may be used in place of or in combination with software instructions to implement processes consistent with the implementations described herein. Thus, implementations described herein are not limited to any specific combination of hardware circuitry and software.

Figure 4:
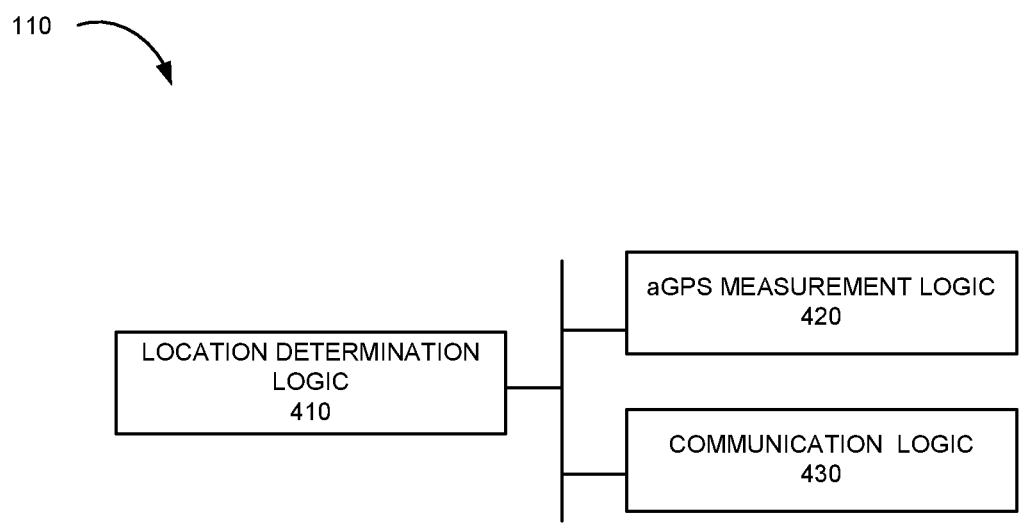
FIG. 4 illustrates an exemplary configuration of logic components implemented in the user equipment device of FIG. 1.

FIG. 4 is an exemplary functional block diagram of components implemented in UE 110. In an exemplary implementation, all or some of the components illustrated in FIG. 4 may be implemented by processor 320 executing software instructions stored in memory 330. In other implementations, all or some of the components illustrated in FIG. 4 may be implemented in hardware or a combination of hardware, firmware and software, such as via chipsets (e.g., GPS chipset 360) used to perform the functionality described below.

UE 110 may include location determination logic 410, aGPS measurement logic 420 and communication logic 430. In alternative implementations, these components or a portion of these components may be located externally with respect to UE 110.

Location determination logic 410 may include logic to identify a coarse location associated with UE 110. In one implementation, location determination logic 410 may identify its coarse location based on the type of UE 110. For example, an Android based UE 110 may include an application programming interface (API) that can identify the WiFi access point (AP) with which UE 110 is in communication and generate a location associated with the WiFi access point. In another implementation, location determination logic 410 may include an API that uses crowd-sourced WiFi hotspot information and/or cell tower locations located in relatively close proximity of UE 110 to identify a coarse location of UE 110. In still another implementation, location determination logic 410 may receive or obtain a WiFi media access control (MAC) address associated with the WiFi AP via which it is communicating and determine a location based on the WiFi AP MAC address.

aGPS measurement logic 420 may include logic to identify location information based on assistance data provided by, for example, location server 120. For example, aGPS measurement logic 420 may receive aGPS assistance information identifying a number of satellites associated with the coarse location of UE 110. aGPS measurement logic 420 may use this information to communicate with the identified satellites to generate aGPS measurements. The aGPS measurements may be used by location server 120 to identify the civic address of UE 110.

Communication logic 430 may include logic to communicate with elements in environment 100 directly or via network 150. For example, communication logic 430 may receive aGPS assistance information from location server 120 and provide aGPS measurements, generated by aGPS measurement logic 420, to location server 120.

Although FIG. 4 shows exemplary components of UE 110, in other implementations, UE 110 may include fewer components, different components, differently arranged components, or additional components than depicted in FIG. 4. In addition, functions described as being performed by one of the components in FIG. 4 may alternatively be performed by another one or more of the components of UE 110.

Figure 5:
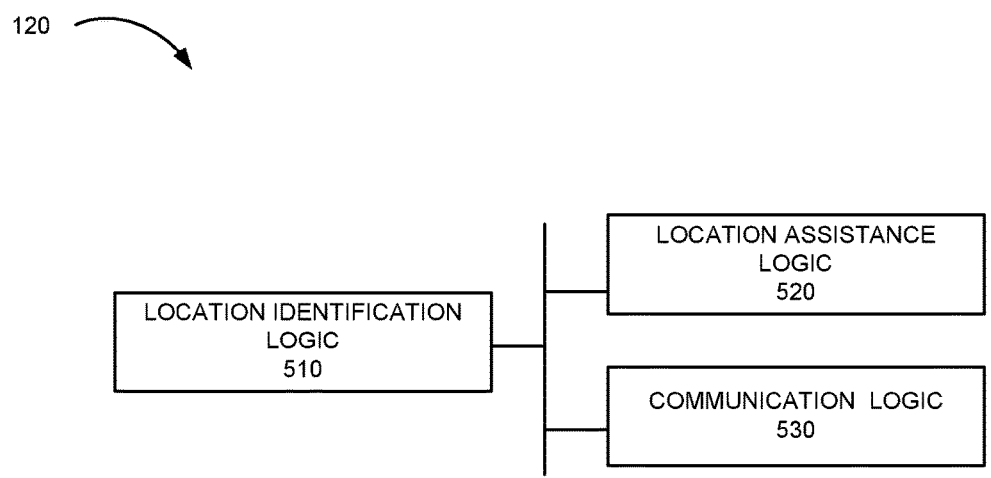
FIG. 5 illustrates an exemplary configuration of logic components implemented in the location server of FIG. 1.

FIG. 5 is an exemplary functional block diagram of components implemented in location server 120. In an exemplary implementation, all or some of the components illustrated in FIG. 5 may be implemented by processor 320 executing software instructions stored in memory 330. In other implementations, all or some of the components illustrated in FIG. 5 may be implemented in hardware or a combination of hardware, firmware and/or software used to perform the functionality described below.

Location sever 120 may include location identification logic 510, location assistance logic 520 and communication logic 530. In alternative implementations, these components or a portion of these components may be located externally with respect to location server 120.

Location identification logic 510 may include logic to identify location information included in, for example, a geolocation header of a SIP Invite message. For example, location identification logic 510 may receive a SIP Invite message associated with an E911 call, examine the geolocation header and determine if location information is included in the header. Location identification logic 510 may forward the location information, when present, to location assistance logic 520.

Location assistance logic 520 may receive coarse location information (e.g., contained in the geolocation header of the SIP Invite message) from location identification logic 510 and generate assistance data associated with an aGPS measurement. For example, typical GPS devices receive navigation messages from each GPS satellite in orbit and use that information to identify satellites with which to communicate to obtain GPS coordinates. In an exemplary implementation, location assistance logic 520 may identify particular GPS satellites based on the coarse location of UE 110 and the particular time of day that may be used to obtain an accurate GPS location of UE 110, as opposed to relying on all components of GPS satellite information (e.g., a full almanac and ephemeris data associated with all the GPS satellites) to obtain GPS measurements.

Communication logic 530 may include logic to communicate with elements in environment 100 directly or via network 150. For example, communication logic 530 may initiate a location session with UE 110 to provide the assistance data for aGPS measurements and receive aGPS measurements from UE 110, as described in detail below.

Although FIG. 5 shows exemplary components of location server 120, in other implementations, location sever 120 may include fewer components, different components, differently arranged components, or additional components than depicted in FIG. 5. In addition, functions described as being performed by one or more of the components of location server 120 in FIG. 5 may alternatively be performed by another one or more of the devices/components of environment 100, such as E-CSCF 270, ECS 130, PSAP 140, etc.

Figure 6:
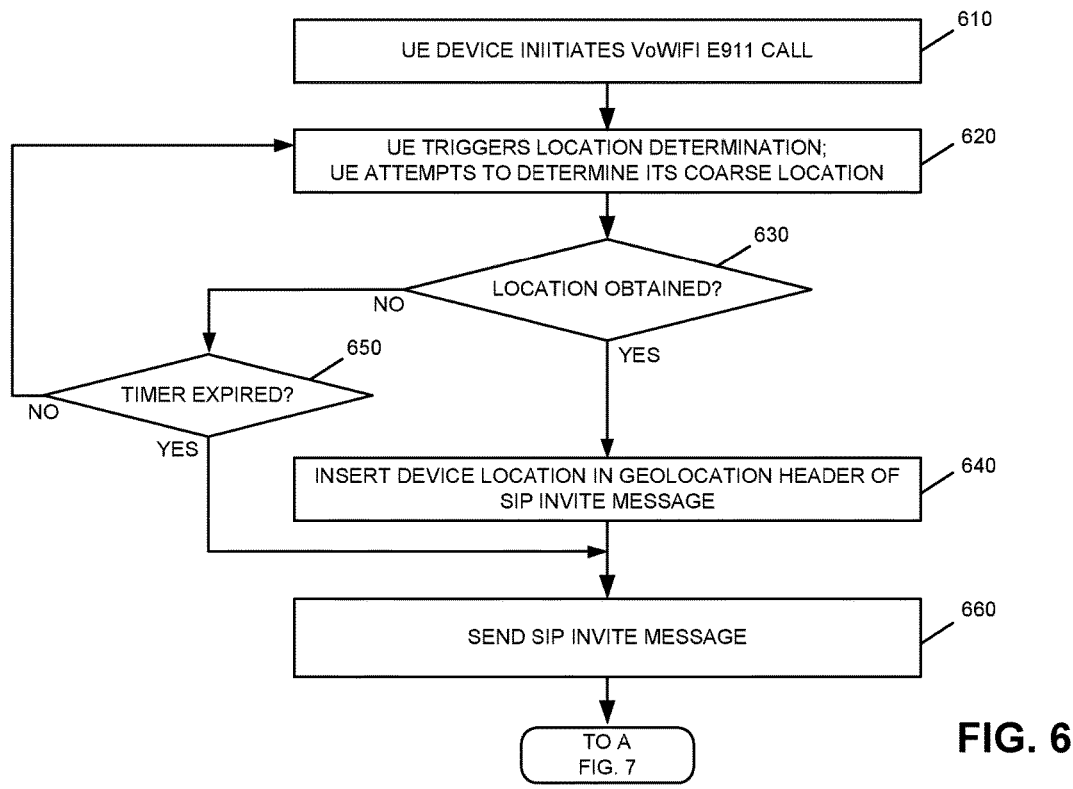
FIGS. 6-8 are flow diagrams illustrating processing by various components in the environment of FIG. 1 in accordance with an exemplary implementation.
Figure 7:
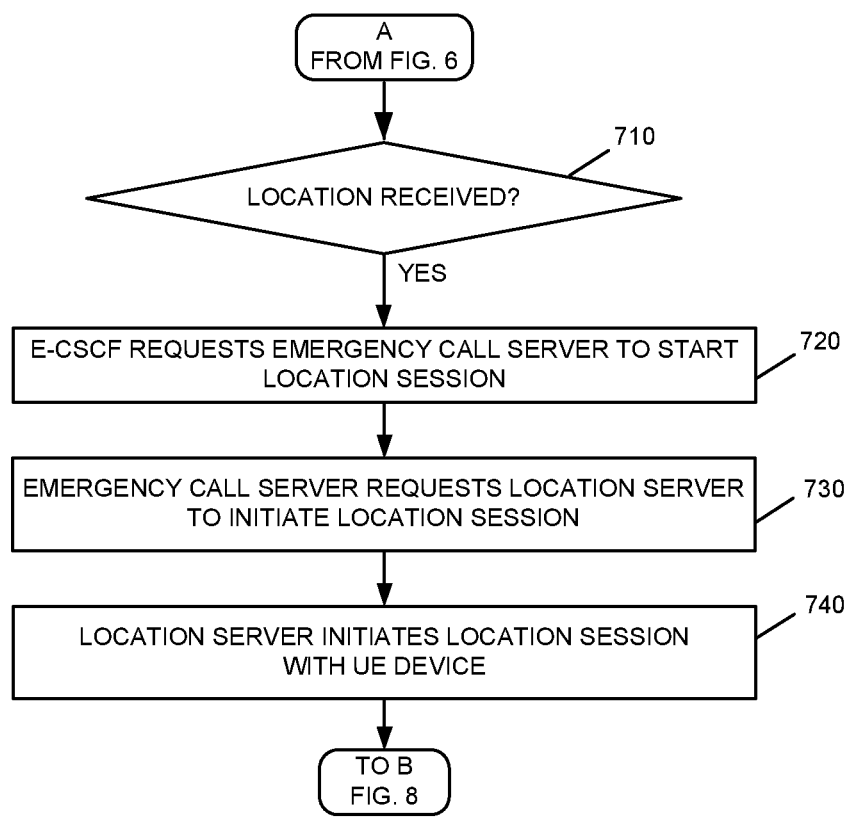
Figure 8:
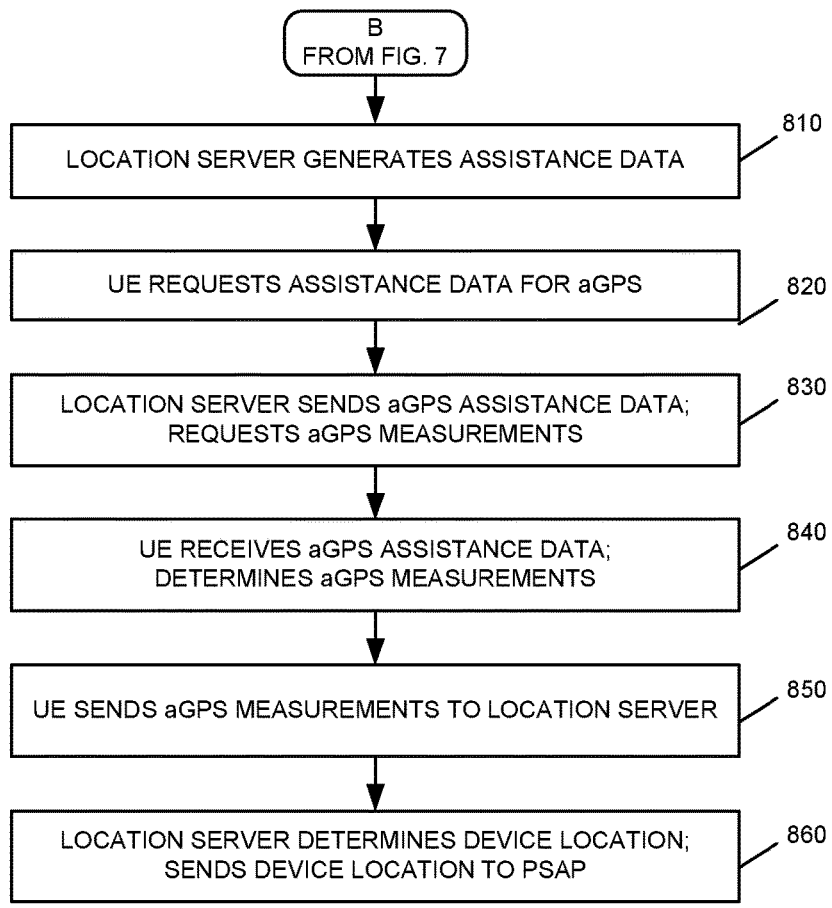
Figure 9:
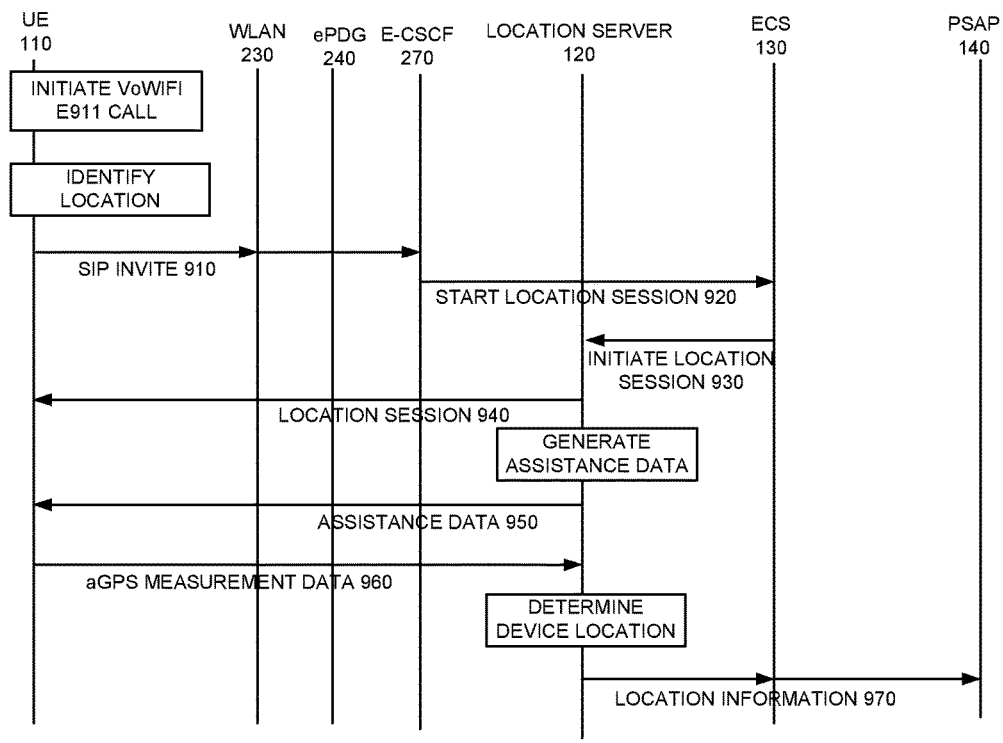
FIG. 9 is a signal flow diagram associated with the processing of FIGS. 6-8.

FIGS. 6-8 are flow diagrams illustrating exemplary processing associated with determining the location of UE 110, and FIG. 9 is a signal flow diagram associated with the processing shown in FIGS. 6-8. Processing may begin with a caller at UE 110 initiating a VoWiFi E911 call (block 610). In response to initiating the E911 call via VoWiFi, UE 110 attempts to determine a location associated with UE 110 (block 620). For example, location determination logic 410 on UE 110 may be triggered in response to UE 110 initiating an E911 call via VoWiFi. In an exemplary implementation, location determination logic 410 may attempt to identify a "coarse" or general location information that does not provide an exact location, such as a street address or geographical coordinates of UE 110, but provides an approximate or general location that can be used by other elements of environment 100 to determine a user's exact location. The term "coarse location" or "general location" as used herein should be construed as any location-based information that provides an approximate location (e.g., within a predetermined distance, such as two miles, 10 miles, etc.) of UE 110.

In an exemplary implementation, the type of coarse location determination performed by UE 110 may be based on the type of UE 110. For example, as described above an Android based UE 110 may include an API that can identify the WiFi access point (AP) via which UE 110 is communicating and generate a location associated with the WiFi access point.

In another implementation, location determination logic 410 may include an API that uses crowd-sourced WiFi hotspot information, such as location information associated with a WiFi hotspot within a wireless range of UE 110. In still another implementation, location determination logic 410 may use its radio to identify a cell tower located in relative close proximity to UE 110 and determine the cell ID or location associated with the cell tower. In still another implementation, location determination logic 410 may receive or obtain a media access control (MAC) address associated with the WiFi AP via which it is communicating and determine a location associated with the WiFi AP MAC address.

In still other implementations, location determination logic 410 may generate or obtain a civic address or a range of civic addresses, such as 11-15 North Maple Avenue, Basking Ridge, N.J. However, the civic address may not be accurate and/or the range of civic addresses may not enable emergency responders to easily identify the caller's actual location. Therefore, even if location determination logic 410 is able to generate or obtain a civic address or range of civic addresses, this information will still be considered coarse information with respect to further processing by location server, as described below.

In each case, location determination logic 410 attempts to determine the coarse location of UE 110. UE 110 may determine if the coarse location is obtained or identified (block 630). If a coarse location is obtained (block 630—yes), UE 110 may populate the geolocation header of a SIP Invite message with the identified coarse location information that is associated with the VoIP call (block 640). For example, in accordance with Internet Engineering Task Force Request for Comments 6442 (IETF RFC 642), UE 110 can include a geolocation header in a SIP Invite message. If the location is not obtained, UE 110 may determine if a timer has expired (block 650). For example, in an exemplary implementation, location determination logic 410 may set a timer to a predetermined time, such as about two seconds or less, for location determination logic 410 to identify its coarse location. It should be understood that other predetermined times may be set in other implementations. In each case, if the timer has not expired (block 650—no), UE 110 may continue to attempt to determine its location (block 620). If, however, the location is not obtained or determined and the timer has expired, processing may continue to block 660.

UE 110 may transmit the SIP Invite message corresponding to the E911 call with the coarse location inserted into the geolocation header of the SIP Invite message, when the location is determined, and transmit the SIP Invite message without the location information in the geolocation header in the scenario in which the location is not determined and the timer has expired (block 660). In either case, UE 110 transmits the SIP Invite message associated with the E911 call via network 150 (FIG. 9, 910). For example, UE 110 transmits the SIP Invite message to WLAN 230, which forwards the message via network 150 (e.g., via ePDG 240, PGW 250 and P-CSCF 260) to E-CSCF 270.

E-CSCF 270 receives the SIP Invite message and determines if the SIP Invite message includes a geolocation header with location information in the geolocation header (FIG. 7, block 710). For example, E-CSCF 270 inspects the SIP Invite message for a geolocation header and determines if the geolocation header includes location information.

Assume that E-CSCF 270 determines that the SIP Invite message includes a geolocation header that has location information in the geolocation header (block 710—yes). E-CSCF 270 may then transmit a request to emergency call server (ECS) 130 to start a location session with UE 110 (block 720; FIG. 9, 920). For example, E-CSCF 270 transmits a message to ECS 130 via MRF/BGCF 280 and PSAP 140, with the location information from the geolocation header, and requests ECS 130 initiate a location session with UE 110. ECS 130 receives the location session request and sends a message with the received location information to location server 120 requesting location server 120 initiate a location session with UE 110 (block 730; FIG. 9, 930).

Location server 120 receives the request from ECS 130 and initiates a location session with UE device 110 (block 740; FIG. 9, 940). Referring back to block 710, if the location information is not received in the geolocation header of the SIP Invite message, E-CSCF 270 transmits the SIP Invite message without the geolocation header to ECS 130. ECS 130, location server 120 and/or PSAP 140 may then interact with UE 110 and/or the caller to obtain the location information in another manner, such as the operator at PSAP 140 may interact with the caller to obtain the location information (not shown in FIG. 7).

Assume that the location server 120 has obtained the coarse location information. In an exemplary implementation, prior to initiating the location session with UE 110, or concurrently with signaling UE 110 to initiate the location session, location server 120 uses the device location information included in the geolocation header of the SIP Invite message to generate assistance data to be used for aGPS measurements (FIG. 8, block 810). In other implementations, after the location session is initiated, UE 110 requests assistance data for aGPS measurements from location server 120 (block 820). In either case, location assistance logic 520 may generate assistance data associated with aGPS measurements based on the coarse location information to allow UE 110 to provide its location information much more quickly than using conventional GPS with no assistance data to identify its location. That is, since the caller has made the call via UE 110 using VoWiFi, no cell identification information associated with a cell tower is available. As a result, using the coarse location information included in the geolocation header of the SIP Invite message allows location server 120 to aid UE 110 in dynamically obtaining its precise location. For example, typical GPS devices receive navigation messages from each GPS satellite in orbit and use that information to identify satellites with which to communicate to obtain GPS coordinates. Receiving assistance data, such as information identifying particular satellites that may be used to obtain the location of UE 110, may allow UE 110 to obtain GPS measurement information more quickly than relying on the information associated with all the GPS satellites. In this manner, location assistance logic 520 may generate assistance data for aGPS to more quickly identify the GPS coordinates of UE 110.

Location server 120 may generate the assistance data based on the coarse location of UE 110, send the generated aGPS assistance data to UE 110 and request GPS measurements from UE 110 (block 830; FIG. 9, 950). UE 110 receives the assistance data and generates aGPS measurements based on the assistance data (block 840). For example, aGPS measurement logic 420 may use the assistance data and generate GPS measurements by communicating with the satellites identified by the assistance data.

UE 110 may then send aGPS measurements to location server 120 (block 850; FIG. 9, 960). Location sever 120 receives the aGPS measurements from UE 110 and determines the civic address of UE 110 based on the aGPS measurements (block 860). For example, location server 120 may determine the aGPS location and access a database that correlates GPS measurements (e.g., the aGPS location) to a civic address. Location server 120 may then send the location information to PSAP 140 (block 860; FIG. 9, 970). For example, location server 120 may send the civic address information to PSAP 140 via ECS 130 (FIG. 9, 970). In some implementations, location server 120 may send the aGPS location (e.g., geodetic information and not a civic address) to PSAP 140. In this case, PSAP 140 may determine the civic address.

Implementations described herein provide for dynamically providing location information, such as a civic address, for an E911 call made using VoWiFi to enable an emergency call center dispatcher to send emergency personnel to the caller's location. The calling device may identify a coarse location and insert the coarse location in a geolocation header of a SIP Invite message. A location server may then use the coarse location to generate assistance data for the calling device to generate aGPS measurements. In this manner, the VoWiFi calling device may more quickly identify its location, as compared to using conventional GPS. In addition, if the caller later moves his/her location and makes another E911 call, the location of the calling device is dynamically determined, without requiring the caller to register his/her location.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to determining a coarse location based on the particular type of UE device (e.g., Android, iPhone, etc.). In other implementations, other types of coarse location information may be obtained that is uniform for all types of devices and/or device manufacturers.

Further, while series of acts have been described with respect to FIGS. 6-8 and signal flows with respect to FIG. 9, the order of the acts and signal flows may be different in other implementations. Moreover, non-dependent acts may be implemented in parallel.

To the extent the aforementioned embodiments collect, store or employ personal information provided by individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A computer-implemented method, comprising:
   receiving, a session initiation protocol (SIP) Invite message associated with a Voice over WiFi (VoWiFi) call made by a user device;
   determining if the SIP Invite message includes a geolocation header comprising location information associated with the user device;
   in response to determining that the SIP Invite message includes a geolocation header comprising location information associated with the user device, initiating a location session with the user device;
   generating assistance data based on the location information, wherein the assistance data is to be used by the user device to generate assisted global positioning system (aGPS) measurements;
   transmitting, to the user device and during the location session, the assistance data;
   receiving, from the user device, aGPS measurements based on the assistance data;
   determining, based on the aGPS measurements, a location of the user device; and
   transmitting information identifying the location of the user device to a public service answering point.

2. The computer-implemented method of claim 1, wherein the SIP Invite message is received by an emergency call session control (E-CSCF) device.

3. The computer-implemented method of claim 2, wherein the determining if the SIP Invite message includes a geolocation header comprising location information is performed by the E-CSCF device, the method further comprising:
   transmitting, by the E-CSCF device, the location information to a location server.

4. The computer-implemented method of claim 3, further comprising:
   determining an approximate or coarse location associated with the user device based on the location information in the geolocation header of the SIP Invite message.

5. The computer-implemented method of claim 4, wherein the generating assistance data comprises:
   generating, by the location server, the assistance data based on the approximate or coarse location.

6. The computer-implemented method of claim 1, wherein the location information comprises WiFi access point information.

7. The computer-implemented method of claim 1, further comprising:
   receiving, from the user device and during the location session, a request for assistance data for aGPS measurements.

8. The computer-implemented method of claim 7, further comprising:
   transmitting, to the user device, the assistance data in response to the request.

9. The computer-implemented method of claim 1, wherein the determining a location comprises:
   determining a civic address at which the user device is located.

10. A system, comprising:
    a memory; and
    at least one device configured to:
      receive, a session initiation protocol (SIP) Invite message associated with a Voice over WiFi (VoWiFi) call made by a user device,
      determine if the SIP Invite message includes a geolocation header comprising location information associated with the user device,
      in response to determining that the SIP Invite message includes a geolocation header comprising location information associated with the user device, initiate a location session with the user device,
      generate assistance data based on the location information, wherein the assistance data is to be used by the user device to generate assisted global positioning system (aGPS) measurements,
      transmit, to the user device and during the location session, the assistance data,
      receive, from the user device, aGPS measurements based on the assistance data,
      determine, based on the aGPS measurements, a location of the user device, and
      transmit information identifying the location of the user device to a public service answering point.

11. The system of claim 10, wherein the at least one device comprises an emergency call session control (E-CSCF) device and a location server.

12. The system of claim 11, wherein the E-CSCF device receives the SIP Invite message and is configured to determine if the SIP Invite message includes a geolocation comprising location information, and
    wherein the E-CSCF device is configured to forward the location information to the location sever.

13. The system of claim 12, wherein the location server is further configured to:
    determine an approximate or coarse location associated with the user device based on the location information in the geolocation header of the SIP Invite message.

14. The system of claim 13, wherein when generating assistance data, the location server is configured to:
    generate the assistance data based on the approximate or coarse location.

15. The system of claim 10, wherein the location information comprises at least one of WiFi access point information or a cell identifier.

16. The system of claim 10, wherein the at least one device is further configured to:

receive, from the user device and during the location session, a request for assistance data for aGPS measurements.

17. The system of claim 16, wherein the at least one device is further configured to:
transmit, to the user device, the assistance data in response to the request.

18. The system of claim 10, wherein when determining a location, the at lease tone device is configured to:
determine a civic address at which the user device is located.

19. A non-transitory computer-readable medium having stored thereon sequences of instructions which, when executed by at least one processor, cause the at least one processor to:
receive, a session initiation protocol (SIP) Invite message associated with a Voice over WiFi (VoWiFi) call made by a user device;
determine if SIP Invite message includes a geolocation header comprising location information associated with the user device;
in response to determining that the SIP Invite message includes a geolocation header comprising location information associated with the user device, initiate a location session with the user device;
generate assistance data based on the location information, wherein the assistance data is to be used by the user device to generate assisted global positioning system (aGPS) measurements;
transmit, to the user device and during the location session, the assistance data;
receive, from the user device, aGPS measurements based on the assistance data;
determine, based on the aGPS measurements, a location of the user device; and
transmit information identifying the location of the user device to a public service answering point.

20. The non-transitory computer-readable medium of claim 19, wherein the instructions further cause the at least one processor to
determine an approximate or coarse location associated with the user device based on information in the geolocation header of the SIP Invite message, and
when generating the assistance data, the instructions cause the at least one processor to:
generate the assistance data based on the approximate or coarse location.

* * * * *